(12) United States Patent
Hur et al.

(10) Patent No.: US 7,336,838 B2
(45) Date of Patent: Feb. 26, 2008

(54) PIXEL-DATA SELECTION DEVICE TO PROVIDE MOTION COMPENSATION, AND A METHOD THEREOF

(75) Inventors: Bong-soo Hur, Suwon-si (KR); Sung-hee Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 797 days.

(21) Appl. No.: 10/812,966

(22) Filed: Mar. 31, 2004

(65) Prior Publication Data

US 2004/0252895 A1   Dec. 16, 2004

(30) Foreign Application Priority Data

Jun. 16, 2003   (KR) ................. 10-2003-0038787

(51) Int. Cl.
  G06K 9/36       (2006.01)
  G06K 9/46       (2006.01)
(52) U.S. Cl. ............... 382/236; 382/238; 382/234; 382/250; 382/251; 348/402.1; 348/407.1
(58) Field of Classification Search ............... 382/232, 382/236, 234, 238, 245, 246, 250, 251, 252, 382/253; 375/240.25, 240.16; 348/607, 348/402.1, 407.1, 413.1, 416.1
See application file for complete search history.

(56) References Cited

U.S. PATENT DOCUMENTS

| | | | |
|---|---|---|---|
| 5,521,642 A * | 5/1996 | Park | 375/240.16 |
| 5,587,741 A * | 12/1996 | Kim | 375/240.17 |
| 5,668,608 A * | 9/1997 | Lee | 348/699 |
| 5,787,210 A * | 7/1998 | Kim | 382/309 |
| 6,295,089 B1 * | 9/2001 | Hoang | 348/390.1 |

(Continued)

FOREIGN PATENT DOCUMENTS

JP       09-65342       3/1997

(Continued)

OTHER PUBLICATIONS

Japanese Office Action dated Oct. 3, 2006 issued in JP 2004-177429.

(Continued)

*Primary Examiner*—Matthew C. Bella
*Assistant Examiner*—Ali Bayat
(74) *Attorney, Agent, or Firm*—Stanzione & Kim, LLP

(57) ABSTRACT

A pixel-data selection device providing motion compensation, and a method thereof. A first and a second storage parts store a current frame/field including first pixel-data and a previous frame/field including second pixel-data, respectively, corresponding to at least one of the inputted candidate motion vectors. A first and a second pixel-data extraction parts extract the first and the second pixel-data corresponding to the candidate motion vector, respectively from the first and the second storage parts. A first and a second compensation pixel calculation parts calculate first and second compensation pixel-data for motion compensation, respectively, by adaptively applying a predetermined first weight according to the abstracted first and second pixel-data. Therefore, the first and the second pixel-data can be calculated based on motion trajectories of a current block to be interpolated and peripheral blocks, and thus, block artifacts can be prevented as the motion compensation is performed adaptively.

25 Claims, 8 Drawing Sheets

U.S. PATENT DOCUMENTS 6,307,887 B1 10/2001 Gabriel

FOREIGN PATENT DOCUMENTS

| | | |
|---|---|---|
| JP | 10-341440 | 12/1998 |
| JP | 2000-115776 | 4/2000 |
| JP | 2003-163894 | 6/2003 |
| KR | 1998-36073 | 8/1998 |
| KR | 2001-58887 | 7/2001 |
| KR | 2001-84661 | 9/2001 |

OTHER PUBLICATIONS

Japanese Office Action dated Sep. 11, 2007 issued in JP 2004-177429.

* cited by examiner

PIXEL-DATA SELECTION DEVICE TO PROVIDE MOTION COMPENSATION, AND A METHOD THEREOF

CROSS-REFERENCE TO RELATED APPLICATIONS

This application claims the benefit of Korean Application No. 2003-38787, filed Jun. 6, 2003, in the Korean Intellectual Property Office, the disclosure of which is incorporated herein by reference.

BACKGROUND OF THE INVENTION

1. Field of the Invention

The present invention relates to a pixel-data selection device to provide motion compensation, and a method thereof, and more particularly, to a pixel-data selection device to provide motion compensation which extracts a plurality of pixel-data by applying a plurality of motion trajectories per block during frame rate conversion, and performs motion compensation by applying a weight to the extracted pixel-data, and a method thereof.

2. Description of the Related Art

Generally, in a PC or an HDTV, frame rate conversion is performed to exchange programs having various broadcasting signal specifications, such as PAL or NTSC. Frame rate conversion refers to converting of a number of frames output per minute. Moreover, in the case where the frame rate increases, a process of interpolating a new frame is required.

Meanwhile, as a broadcasting technology has developed recently, the frame rate conversion is performed after compressing an image data by an image data compressing method, such as a moving picture experts group (MPEG) and an H.263. Especially, in a field of image processing such as the MPEG processing, an image signal usually has redundancy due to high autocorrelation. Therefore, by removing the redundancy while compressing the data, efficiency of data compression can be improved. Here, for effective compression of a video frame which varies according to time, the redundancy in the time-axis direction should be removed.

The removal of the redundancy in the time-axis direction is based on a concept that an amount of data to be transferred is greatly reduced by replacing unchanged portions or moved-but-still-similar portions in a current frame with corresponding portions in an immediately preceding frame.

To make the replacement, it is necessary to find the most similar block between the current frame and a reference frame, which is called "motion estimation." An indication of an amount of displacement of the block is called a "motion vector."

One of typical methods to estimate motion vectors is a block matching algorithm (BMA). The BMA is generally used in consideration of precision, real-time processing ability, and hardware implementation and the like.

FIG. 1 is a drawing illustrating a method of estimating motion vectors using a general conventional BMA.

Referring to FIG. 1, $F_{n-1}$ is a previous frame/field, $F_n$ is a current frame/field, and $F_i$ is a frame to be interpolated using the previous frame/field ($F_{n-1}$) and the current frame/field ($F_n$).

The Block Matching Algorithm compares two consecutive images, such as the previous frame/field and the current frame/field, by block units, and estimates one motion vector per block based on an assumption that the pixels in the compared blocks have translational movement. At this time, the motion vector is estimated using a well-known SAD (Sum of Absolute Difference) prediction error. When the motion vector is estimated, motion compensation is performed with respect to the current block (B), i.e., the block to be interpolated using the estimated motion vectors (MV).

However, the conventional method of estimating/compensating the motion may have an incorrect estimation of respective motion vectors estimated by blocks. If the motion compensation is performed with the incorrect motion vectors, block artifacts occur in the interpolation frame/field ($F_i$), as shown in FIG. 2. In FIG. 2, a solid line represents a true motion vector, and a dotted line is an estimated motion vector. The block artifacts occur since the motion compensation is performed by blocks, and thus the correlation between adjacent blocks at the boarder between the blocks is not considered. A conventional frame rate conversion (FRC) algorithm may employ a nonlinear filter, such as a median filter, to remove the block artifacts. However, the nonlinear filter is not remarkably effective, especially in preventing deterioration of image quality.

SUMMARY OF THE INVENTION

Accordingly, it is an aspect of the present invention to provide a pixel-data selection device to provide motion compensation, which is capable of preventing or removing block artifacts caused by inaccurately estimated motion vectors, in performing the motion compensation by estimating one motion vector per block, and a method thereof.

Additional aspects and advantages of the invention will be set forth in part in the description which follows and, in part, will be obvious from the description, or may be learned by practice of the invention.

The foregoing and/or other aspects of the present invention are achieved by providing a pixel-data selection device to provide motion compensation, the device including a first storage part, a second storage part, first and a second pixel-data extraction parts, and first and a second compensation pixel calculation parts.

The first storage part can store a current frame/field which includes a first pixel-data corresponding to at least one of candidate motion vectors as inputted. The second storage part can store a previous frame/field which includes a second pixel-data corresponding to the at least one of the candidate motion vectors. The first and the second pixel-data extraction parts extract the first and the second pixel-data, which correspond to the at least one candidate motion vector, respectively, from the first and the second storage parts, respectively. Further, the first and the second compensation pixel calculation parts calculate, respectively, a first and a second compensation pixel-data for motion compensation, by adaptively applying at least one predetermined first weight according to the first and the second pixel-data. The calculated first and second compensation pixel-data are used for the motion compensation of a current block to be interpolated.

In particular, the first and the second pixel-data extraction parts can extract the first and the second zero pixel-data corresponding to a block having the candidate motion vector of zero, respectively from the first and the second storage parts, and the abstracted first and second zero pixel-data can be used for the motion compensation of the current block.

In addition, the first and the second compensation pixel calculation parts respectively multiply the first and the second pixel-data by the first weights, which is adaptively applied according to the first and the second pixel-data, and add the results of the multiplication to obtain the first and the second compensation pixel-data, respectively.

The sum total of the first weights applied by the first and the second pixel-data is 1.

Further, the candidate motion vector may include the motion vector of the current block in the current frame/field and a motion vector of at least one peripheral block adjacent to the current block.

At least one of the candidate motion vectors is a vector estimated from a position corresponding to the minimum value, among a plurality of motion prediction errors calculated by applying a block matching algorithm with respect to the current block and the respective peripheral blocks.

In an aspect of the invention, the first weight, which is applied according to at least one of the first and the second pixel-data, is inversely proportional to the motion prediction error calculated by the current block and the peripheral blocks.

The motion prediction error may be calculated by a sum of absolute difference (SAD) or a mean absolute difference (MAD).

In addition, the pixel-data selection device may further include a first delay device to delay an inputted frame/field for a predetermined time period, and to supply the delayed current frame/field to the first storage part, and a second delay device to delay the current frame/field inputted from the first delay device, for a predetermined time period, and to supply the delayed previous frame/field to the second storage part.

The first and the second pixel-data extraction parts extract at least one of the first and the second pixel-data by estimating motion trajectories by at least one of the candidate motion vectors.

The first and the second storage parts store adjacent fields of the same property, and the fields of the same property are one of an odd field and an even field.

In addition, the device may further include, with the frame/field being inputted by a field unit, a first delay device to delay an inputted field for a predetermined time period, and to supply the delayed first field to the first storage part, a second delay device to delay the first field inputted from the first delay device, for a predetermined time period, and to output the delayed second field, and a third delay device to delay the second field inputted from the second delay device, for a predetermined time period, and to supply the delayed third field to the second storage part, wherein the first and the third fields are of the same property.

The foregoing and/or other aspects of the present invention are also achieved by providing a method of pixel-data selection for motion compensation, of the method comprising: storing a current frame/field including at least one of a first pixel-data corresponding to at least one of candidate motion vectors as inputted, storing a previous frame/field including at least one of a second pixel-data corresponding to the at least one of the candidate motion vectors, extracting the first and the second pixel-data, which respectively correspond to the at least one candidate motion vector, respectively, from the first and the second storage parts; and calculating respectively the first and the second compensation pixel-data for motion compensation, by adaptively applying at least one predetermined first weight according to the first and the second pixel-data. The calculated first and second compensation pixel-data are used for the motion compensation of a current block to be interpolated.

More particularly, the first and the second pixel-data extracting operations extract the first and the second zero pixel-data corresponding to a block having the candidate motion vector of zero, respectively from the first and the second storage parts, and the extracted first and second zero pixel-data are used for the motion compensation of the current block.

The first and the second compensation pixel calculating operations multiply the first and the second pixel-data by the first weights, respectively, which are adaptively applied according to the first and the second pixel-data, and add the results of the multiplication to obtain the first and the second compensation pixel-data, respectively.

In an aspect of this invention, the pixel-data selection method further includes the operations of, prior to the current frame/field storing operation, delaying an inputted frame/field for a predetermined time, and outputting the delayed current frame/field, and prior to the previous frame/field storing operation, delaying the current frame/field inputted from the first delay device, for a predetermined time, and supplying the delayed previous frame/field to the second storage part.

The first and the second pixel-data extracting operations extract at least one of the first and the second pixel-data by estimating motion trajectories by at least one of the candidate motion vectors.

BRIEF DESCRIPTION OF THE DRAWINGS

These and other objects and advantages of the present invention will become apparent and more readily appreciated from the following description of the embodiments, taken in conjunction with the accompanying drawings of which: These and other features, aspects, and advantages of the present invention will become better understood with regard to the following description, appended claims, and accompanying drawings where:

DETAILED DESCRIPTION OF THE PREFERRED EMBODIMENTS

Figure 1:
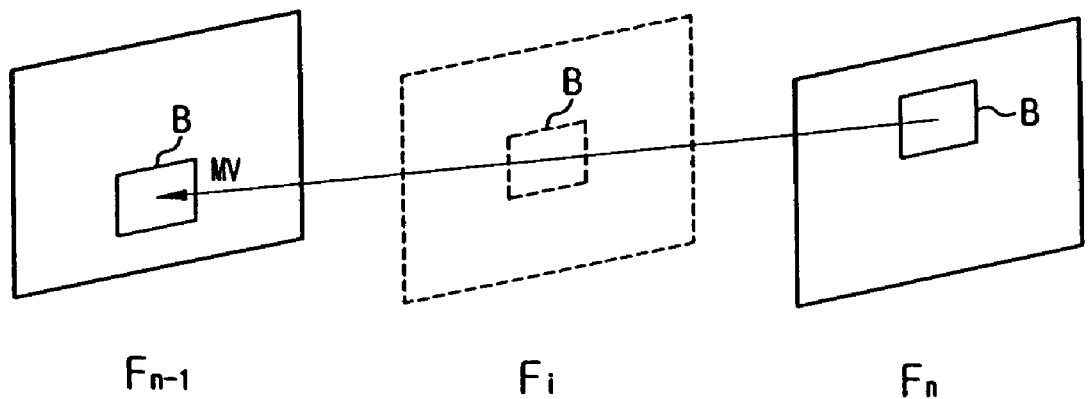
FIG. 1 is a drawing illustrating a method for estimating motion vectors using a general conventional block matching algorithm.

Reference will now be made in detail to the embodiments of the present invention, examples of which are illustrated in the accompanying drawings, wherein like reference numerals refer to the like elements throughout. The embodiments are described below in order to explain the present invention by referring to the figures.

Figure 3:
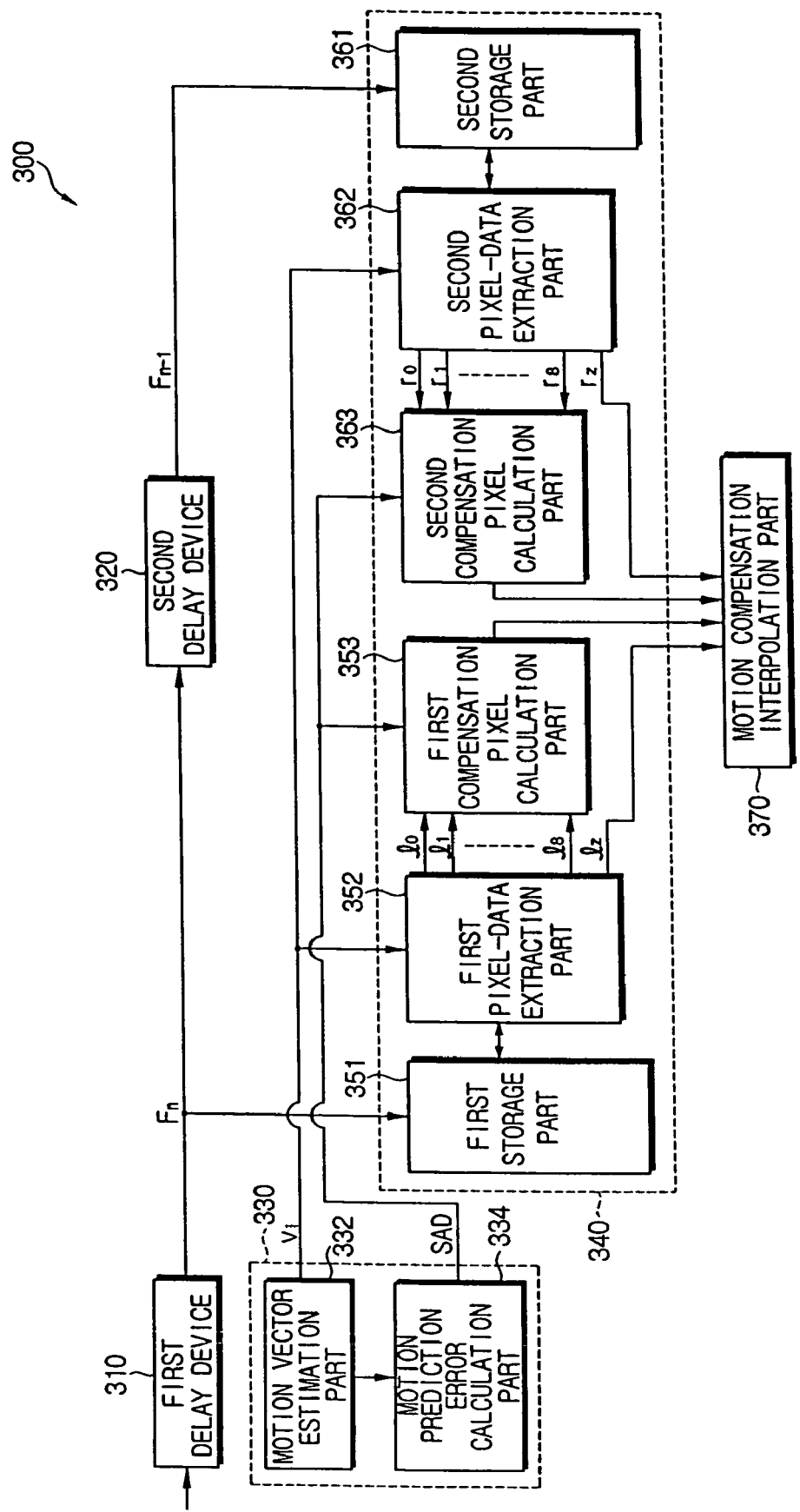
FIG. 3 is a block diagram schematically illustrating a motion estimation/compensation device where a pixel-data selection device is installed according to an embodiment of the present invention.

FIG. 3 is a block diagram schematically illustrating a motion estimation/compensation device where a pixel-data selection device is installed according to an embodiment of the present invention.

Referring to FIG. 3, a motion estimation/compensation device 300 installed with a pixel-data selection device according to this embodiment of the present invention may include a first delay device 310, a second delay device 320, a motion estimation part 330, a pixel-data selection part 340 and a motion compensation interpolation part 370. The present invention relates to a frame rate conversion or an MPEG technique to estimate a plurality of motion vectors and to compensate the motion vectors, and will be described only with reference to blocks that are related to the motion estimation/compensation.

The first delay device 310 delays an inputted frame/field for a predetermined time period, and provides the first delay frame/field to the second delay device 320 and a first storage part 341. The second delay device 320 delays the first delay frame/field inputted from the first delay device 310, and provides the second delay frame/field to the second storage part 361. Hereinafter, the first delay frame/field is referred to as the current frame/field ($F_n$), and the second delay frame/field is refered to as the previous frame/field ($F_{n-1}$).

Meanwhile, in a case where the motion estimation/compensation device 300, installed with the pixel-data selection device according to FIG. 3, converts a frame rate of an image which is inputted by interlacing, the first delay frame/field is the current frame/field ($F_n$), and the second delay frame/field is the previous frame/field ($F_{n-1}$). Therefore, when the previous field is an odd or an even numbered field, the current field becomes an even or an odd numbered field, respectively, corresponding to the previous field.

The motion estimation part 330 estimates the motion vectors between the previous frame/field ($F_{n-1}$) and the current frame/field ($F_n$) through BMA. To estimate the motion vectors, the motion estimation part 330 has a motion vector estimation part 332 and a motion prediction error calculation part 334.

The motion vector estimation part 332 divides the current frame/field ($F_n$) into blocks of a predetermined size to be interpolated, and calculates a plurality of motion prediction errors with respect to the respective blocks to be interpolated by matching the divided blocks with a plurality of blocks constituting the previous frame/field ($F_{n-1}$) respectively, in a single direction.

Figure 4A:
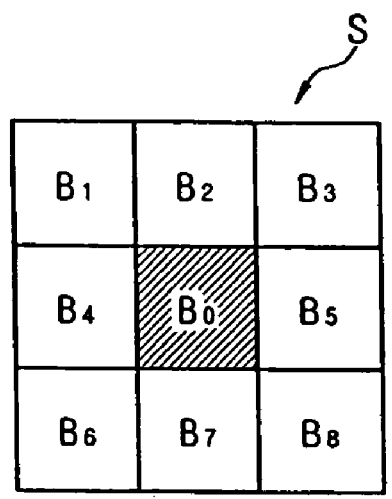
FIG. 4A illustrates a current block and peripheral blocks set for the motion estimation in a motion estimation part of FIG. 3.

More specifically, the motion vector estimation part 332 sets up a predetermined searching range S, as shown in FIG. 4A, in the current frame/field ($F_n$) which is divided into the blocks of predetermined sizes. The motion vector estimation part 332 also calculates a plurality of motion prediction errors with respect to the respective blocks to be interpolated by matching the blocks to be interpolated in the searching range with a plurality of blocks constituting the previous frame/field ($F_{n-1}$) respectively, in a single direction, or in two directions.

The motion prediction error can be calculated by a variety of methods such as by a Sum of Absolute Difference (SAD) method, a Mean Absolute Difference (MAD) method and the like. The SAD is employed in this embodiment of the present invention.

When a plurality of SADs are calculated with respect to the respective blocks to be interpolated, the motion vector estimation part 332 estimates the motion vectors of the respective blocks using an Equation 1 below.

$$v = arg\ min_{v \in S}\{\Phi(v)\} \quad \text{[Equation 1]}$$

Referring to [Equation 1], $\phi(v)$ is an SAD, v is a motion vector of a block having a minimum SAD (from now on, 'v' represents a vector), and S is the searching range. The motion vector estimation part 332 estimates the motion vectors of the respective blocks to be interpolated starting from a position which includes the minimum SAD among a plurality of SADs calculated by the respective blocks to be interpolated.

Figure 4B:
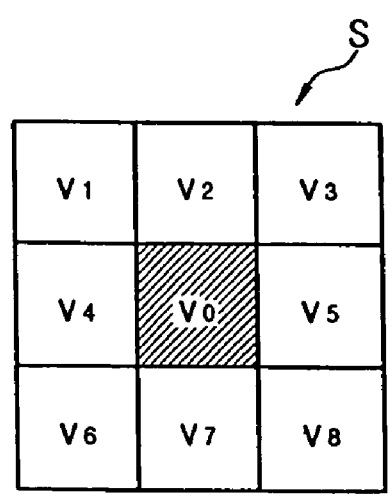
FIG. 4B illustrates a final motion vector with respect to the current and the peripheral blocks of FIG. 4A, respectively.

When the final motion vector of the current block $B_0$ to be interpolated is $v_0$ in FIG. 4B, the final vectors of the peripheral blocks $B_1$ to $B_8$ are $v_1$ to $v_8$, respectively.

Meanwhile, the searching range S, set up in the current frame/field $F_n$, refers to an area to be interpolated in interpolation frame/field $F_i$. The number of blocks existing in the searching range S can be set up variously according to the size of the blocks and/or the searching range S.

Further, the motion vector estimation part 332 provides the motion prediction error calculation part 334 with a zero motion vector $v_z$, of which the motion vector of the current block $B_0$ to be interpolated, as well as the motion vectors $v_0$ to $v_8$ of the respective blocks $B_0$ to $B_8$ existing in the searching range S, is zero. This is because compensating regardless of the motions is more correct than estimating the motion vectors by BMA in a case where the motions are complicated and not in a translation movement, in a process of the motion compensation. The motion compensation process will be described below.

The motion prediction error calculating part 334 extracts the SAD corresponding to the motion vectors $v_z$ and $v_0$ to $v_8$ supplied from the motion vector estimation part 332, using an [Equation 2] below.

$$\Phi(v_i) = \sum_{x \in B} |f(x + v_i, n-1) - f(x, n)|,\ i = 0, 1, 2, \ldots, M \quad \text{[Equation 2]}$$

Here, $\Phi(v_i)$ represents the SAD corresponding to the respective motion vectors $v_0$ to $v_8$, x represents a vector as a coordinate data of a predetermined pixel located in a predetermined block which is one of $B_0$ to $B_8$, $v_i$ represents motion vectors $v_0$ to $v_8$ of the respective blocks $B_0$ to $B_8$, n represents time intervals between the previous frame/field ($F_{n-1}$) and the current frame/field ($F_n$), and M represents the number of the respective blocks $B_0$ to $B_8$ existing in the searching range S. The motion prediction error calculation part 334 also extracts the SAD with respect to the zero motion vector $v_z$ of the current block $B_0$ to be interpolated, using the [Equation 2].

Referring to [Equation 2], the motion prediction error calculation part 334 extracts the SAD corresponding to the motion vectors $v_1$ to $v_8$ of the respective peripheral blocks $B_1$ to $B_8$ and the zero motion vector $v_z$, among all the SADs calculated with respect to the current block $B_0$. That is, the motion vectors $v_z$ and $v_0$ to $v_8$, which are provided by the motion vector estimation part 332, are applied as candidate motion vectors of the current block $B_0$ to be interpolated.

This is performed in order to do motion compensation more accurately when the motion vector $v_0$ of the current block $B_0$ is inaccurately estimated, by replacing motion vectors of better-estimated blocks among the peripheral blocks $B_1$ to $B_8$, i.e., a block having the minimum SAD, with the final motion vector of the current block $B_0$, or performing the motion compensation more correctly by applying a weight to pixels corresponding to the better-estimated peripheral blocks $B_1$ to $B_8$.

That is, the motion compensation, according to this embodiment of the present invention, is performed considering the motion trajectories of the peripheral blocks $B_1$ to $B_8$ as well as the current block $B_0$, assuming that motions between the blocks $B_0$ to $B_8$ are smooth. This is to prevent the occurrence of block artifacts caused when the motion vector $v_0$ of the current block $B_0$ is inaccurately estimated, as illustrated, for example, in FIG. 2.

Meanwhile, when the SADs corresponding to the respective candidate motion vectors $v_z$, $v_0$ to $v_8$ are extracted out, the motion prediction error calculation part 334 supplies the respective SADs to first and the second compensation pixel calculation parts 353 and 363.

Further, first and second pixel-data extraction parts 352 and 362, respectively, are provided with the motion trajectories considered by the motion vectors of the respective blocks $B_0$ to $B_8$ estimated from the motion vector estimation part 332, or provided with the motion vectors (not shown) which are estimated with respect to all the divided blocks (not shown).

Figure 5:
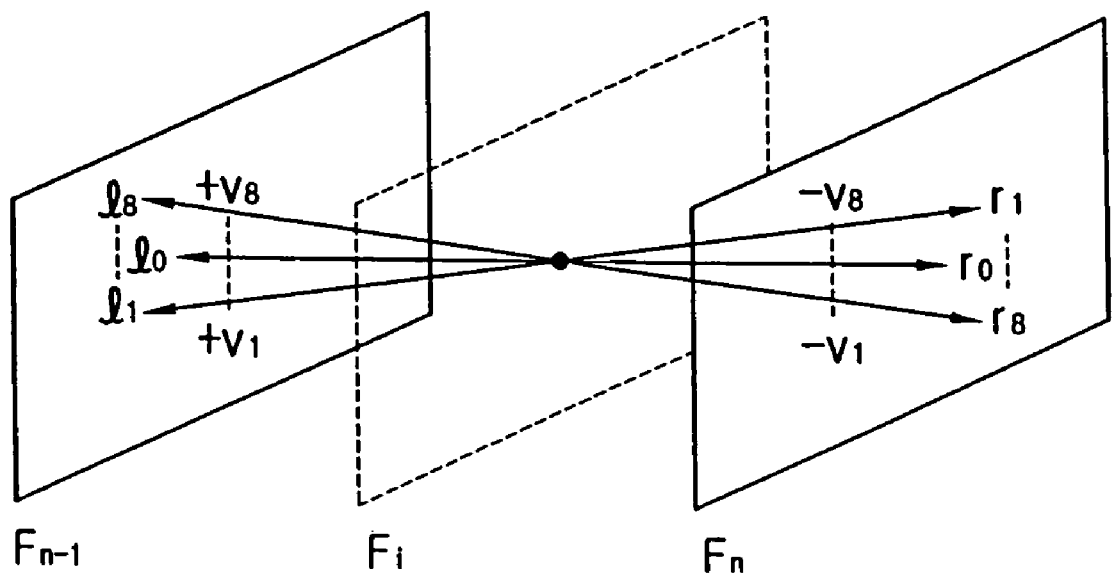
FIG. 5 schematically illustrates motion trajectories with respect to a certain position of a frame/field which is to be interpolated, using the final motion vector of the current and the peripheral blocks of FIG. 4B.

FIG. 5 schematically illustrates motion trajectories with respect to a predetermined position of a frame/field to be interpolated, using the final motion vector of the current and the peripheral blocks.

Referring to FIG. 5, $F_{n-1}$ is a previous frame/field, $F_n$ is a current frame/field, and $F_i$ is a frame/field to be interpolated. The previous frame/field ($F_{n-1}$) and the current frame/field ($F_n$) are inputted consecutively. A temporary compensation pixel-data with respect to the certain position of the interpolation frame/field ($F_i$) is calculated by using an [Equation 3] below.

$$f_i(x, n-1/2) = \frac{f_i(x+v_i/2, n-1) + f_i(x-v_i/2, n)}{2}, i = 0, 1, 2, \ldots, M \quad \text{[Equation 3]}$$

Here, (n-½) represents a temporal position of the frame/field ($F_i$) to be interpolated, $f_i$ (x, n-½) represents a temporary compensation pixel-data of the interpolation frame/field ($F_i$) at the x position, and $v_i$ represents the final motion vector $v_0$ of the current block $B_0$, and the final motion vectors $v_1$ to $v_8$ of the peripheral blocks $B_1$ to $B_8$.

Referring to the [Equation 3] above, M represents the number of the considered motion trajectories. The temporary compensation pixel-data $f_i$ (x, n-½) at the x position, which is obtained by a plurality of motion trajectories, is calculated while considering the plurality of final motion vectors $v_0$ to $v_8$ which are calculated from the [Equation 2]. In this manner, the block artifacts, which are usually caused due to inaccurately estimated final motion vector $v_0$ of the current block $B_0$, can be prevented.

Meanwhile, for the candidate motion vectors $v_0$ to $v_8$ of the current block $B_0$ to be interpolated as described, not only the final motion vectors $v_0$ to $v_8$ with respect to the peripheral blocks $B_1$ to $B_8$, but also global motion vectors detected through a motion analysis process and motion vectors detected in the previous frame/field of the same position, can be re-used. Further, the transformed motion vectors, which are obtained by a median filter of the candidate motion vectors or an average filter, can be used for the candidate motion vectors of the current block $B_0$.

Referring to FIG. 3, the pixel-data selection part 340 selects at least one compensation pixel using pixel-data of pixels constituting a frame/field inputted therein, a plurality of SADs provided by the motion estimation part 330, and the candidate motion vectors. To select at least one compensation pixel, the pixel-data selection part 340 according to this embodiment comprises a first storage part 351, the first pixel-data extraction part 352, the first compensation pixel calculation part 353, a second storage part 361, the second pixel-data extraction part 362, and the second compensation pixel calculation part 363.

In the first storage part 351, pixel-data of the pixels constituting the current frame/field ($F_n$) inputted from the first delay device 310 are temporarily stored.

The first pixel-data extraction part 352 extracts the first pixel-data $I_0$ to $I_8$ corresponding to the respective final motion vectors $v_0$ to $v_8$ inputted from the motion vector estimation part 332, starting from the pixel-data of the current frame/field ($F_n$) stored in the first storage part 351. The first pixel-data $I_0$ to $I_8$ is expressed by an [Equation 4] below.

$$I_i = f_i(x-v_i/2, n), i=0, 1 \ldots, M \quad \text{[Equation 4]}$$

Referring to [Equation 4], the pixel-data extracted by the first pixel-data extraction part 352 have the first pixel-data $I_0$ to $I_8$, and the number of the first pixel-data corresponds to the number of the candidate motion vectors which are estimated at the motion estimation part 330.

In addition, the first pixel-data extraction part 352 extracts from the first storage part 351 the first pixel-data $I_z$ corresponding to the zero motion vector $v_z$ inputted from the motion vector estimation part 332, and supplies the first pixel-data to the motion compensation interpolation part 370. Here, the first pixel-data extraction part 352 may recognize the candidate motion vector having zero value as the zero motion vector $v_z$, and extracts a compensating pixel-data $I_z$ for a block having a candidate motion vector which is zero.

The first compensation pixel calculation part 353 considers accuracy at the respective motion trajectories using the SAD corresponding to the respective blocks $B_0$ to $B_8$ inputted from the motion estimation error calculation part 332, and applies a predetermined weight to the respective temporary compensation pixel-data calculated by the [Equation 3]. That is, the first compensation pixel calculation part 353 calculates the first compensation pixel-data I' which is applied with the weight, using [Equation 4] to [Equation 7].

$$f_w(x, n-1/2) = \sum_{i=0}^{M} w_i f_i(x, n-1/2) = \sum_{i=0}^{M} w_i I_i + \sum_{i=0}^{M} w_i r_i = I' + r' \quad \text{[Equation 5]}$$

Here, the weight $w_i$ needs to satisfy [Equation 6], and the weights with respect to the respective motion trajectories are calculated by [Equation 7].

$$\sum_{i=0}^{M} w_i = 1 \quad \text{[Equation 6]}$$

$$w_i = \frac{1/\Phi(v_i)}{\sum_{i=0}^{M} 1/\Phi(v_j)}, i = 0, 1, \ldots, M \quad \text{[Equation 7]}$$

Referring to [Equation 5] through [Equation 7], the first compensation pixel-data I' calculated from the first compensation pixel calculation part 353, are as follows. This is because $r_i$ is zero since only pixel-data with respect to the current frame/field ($F_n$) are stored in the first storage part 351.

$$I' = \sum_{i=0}^{M} w_i l_i$$

In addition, the weight $w_i$ with respect to the respective motion trajectories is inversely proportional to the minimum SADs of the respective blocks $B_0$ to $B_8$. That is, the first compensation pixel calculation part 353 recognizes that the smaller the minimum SAD is, in comparing the minimum SADs of the respective blocks $B_0$ to $B_8$, the more accurate motion estimation has been performed, and therefore applies the weight $w_i$ which is inversely proportional to the minimum SADs. That is, the accuracy in the respective motion trajectories is determined depending on the SADs.

On the other hand, in the second storage part 361, pixel-data of the previous frame/field ($F_{n-1}$) inputted from the first delay device 310 is temporarily stored.

The second pixel-data extraction part 362 extracts the second pixel-data $r_0$ to $r_8$, respectively, corresponding to the final motion vectors $v_1$ to $v_8$ inputted from the motion vector estimation part 332, from the pixel-data of the previous frame/field ($F_{n-1}$) stored in the second storage part 361. The second pixel-data $r_0$ to $r_8$ are calculated by an [Equation 8] below.

$$r_i = f_i(x - v_i/2, n), i = 0, 1, \ldots, M \quad \text{[Equation 8]}$$

Referring to the [Equation 8], the pixel-data extracted out from the second pixel-data extraction part 362 have the second pixel-data $r_0$ to $r_8$, respectively. Further, the second pixel-data extraction part 362 extracts the second pixel-data $r_z$ corresponding to the zero motion vector $v_z$ inputted from the motion vector estimation part 332, from the second storage part 361. The second pixel-data extraction part 362 may recognize the candidate motion vector having zero value as the zero motion vector, and extracts the compensating pixel-data $r_z$ corresponding to a block having the candidate motion vector which is zero.

The second compensation pixel calculation part 363 considers accuracy at the respective motion trajectories using the minimum SADs of the respective blocks $B_0$ to $B_8$ inputted from the motion estimation error calculation part 332, and applies a predetermined weight to the respective temporary compensation pixel-data calculated by the [Equation 3]. That is, the second compensation pixel calculation part 363 calculates the second compensation pixel-data r' which is applied with the weight, using the [Equation 5] to [Equation 8].

Referring to [Equation 5] to [Equation 8], the second compensation pixel-data r' calculated at the second compensation pixel-data calculation part 363 is as follows. This is because $I_z$ is zero since only pixel-data with respect to the previous frame/field ($F_{n-1}$) are stored in the second storage part 361.

$$r' = \sum_{i=0}^{M} w_i r_i$$

As described above, the pixel-data selection part 340 calculates or extracts the first and the second compensation pixel-data I' and r', respectively, and the first and the second pixel-data $I_z$ and $r_z$, respectively, for temporal averaging, and supplies the data to the motion compensation interpolation part 370.

The motion compensation interpolation part 370 calculates the final interpolation pixel-data f using a soft switching value k inputted from a reliability calculation part (not shown). The final interpolation pixel-data f is calculated by the following [Equation 9].

$$f(x, n - 1/2) = \quad \text{[Equation 9]}$$
$$k\left(\sum_{i=0}^{M} w_i f_i(x, n - 1/2)\right) + (1 - k)\left(\frac{f(x, n - 1) + f(x, n)}{2}\right)$$

In the [Equation 9], k is the soft switching value to adaptively apply the first and the second compensation pixel-data I' and r', respectively, for the motion compensation, and also the first and the second pixel-data $I_z$ and $r_z$, respectively, which are irrespective of the motion. The value k is determined according to the reliability of the first and the second compensation pixel-data I' and r', respectively. That is, when the reliability of the first and the second compensation pixel-data I' and r', respectively, are higher than that of the first and the second pixel-data $I_z$ and $r_z$, respectively, k increases to calculate the final interpolation pixel-data f to which more of the first and the second compensation pixel-data I' and r', respectively, are applied. On the other hand, when the reliability of the first and the second compensation pixel-data I' and r', respectively, are lower than that of the first and second pixel-data $I_z$ and $r_z$, respectively, k decreases to calculate the final interpolation pixel-data f to which more of the first and the second pixel-data $I_z$ and $r_z$, respectively, are applied.

Figure 6:
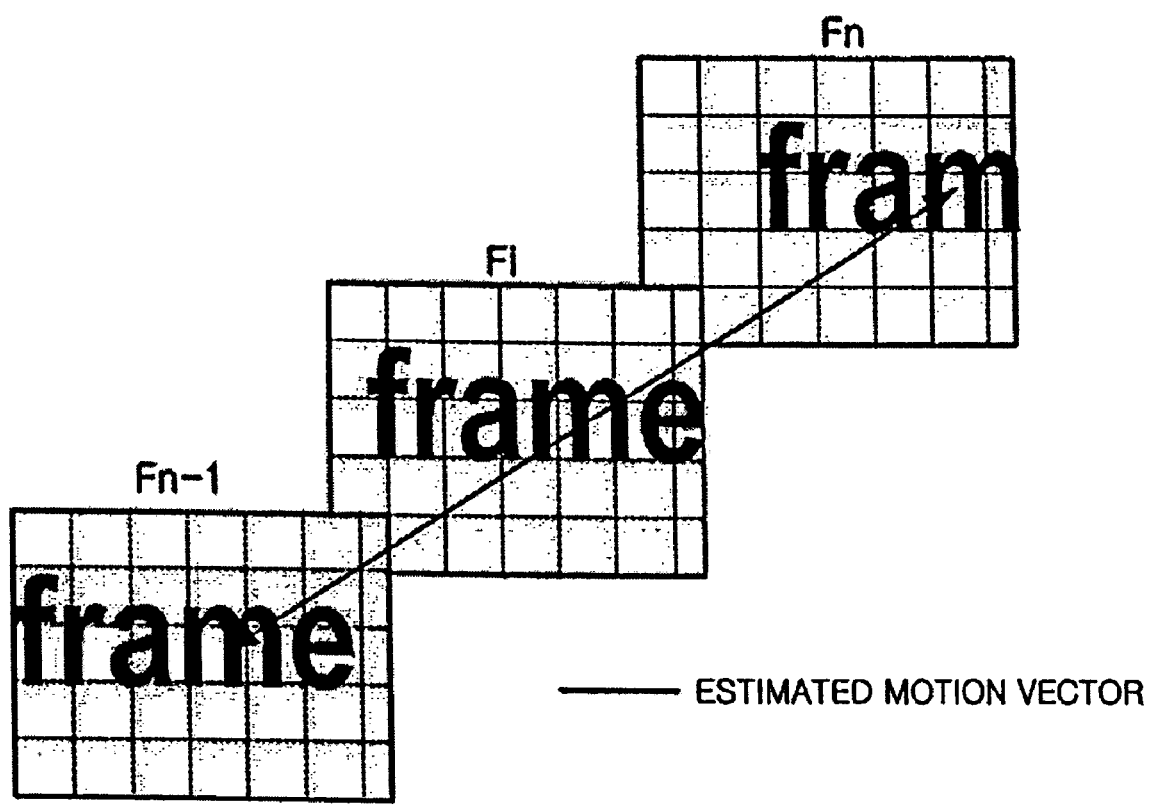
FIG. 6 is an example simulation of an image where the block artifacts are removed by the motion estimation/compensation device of FIG. 3.

Accordingly, there can be provided an image with less block artifacts phenomenon, as illustrated in FIG. 6, by employing the final interpolation pixel-data f considering a plurality of the motion trajectories, based on an assumption that motions between the blocks are smooth. In FIG. 6, the solid line refers to the estimated motion vector.

Figure 7:
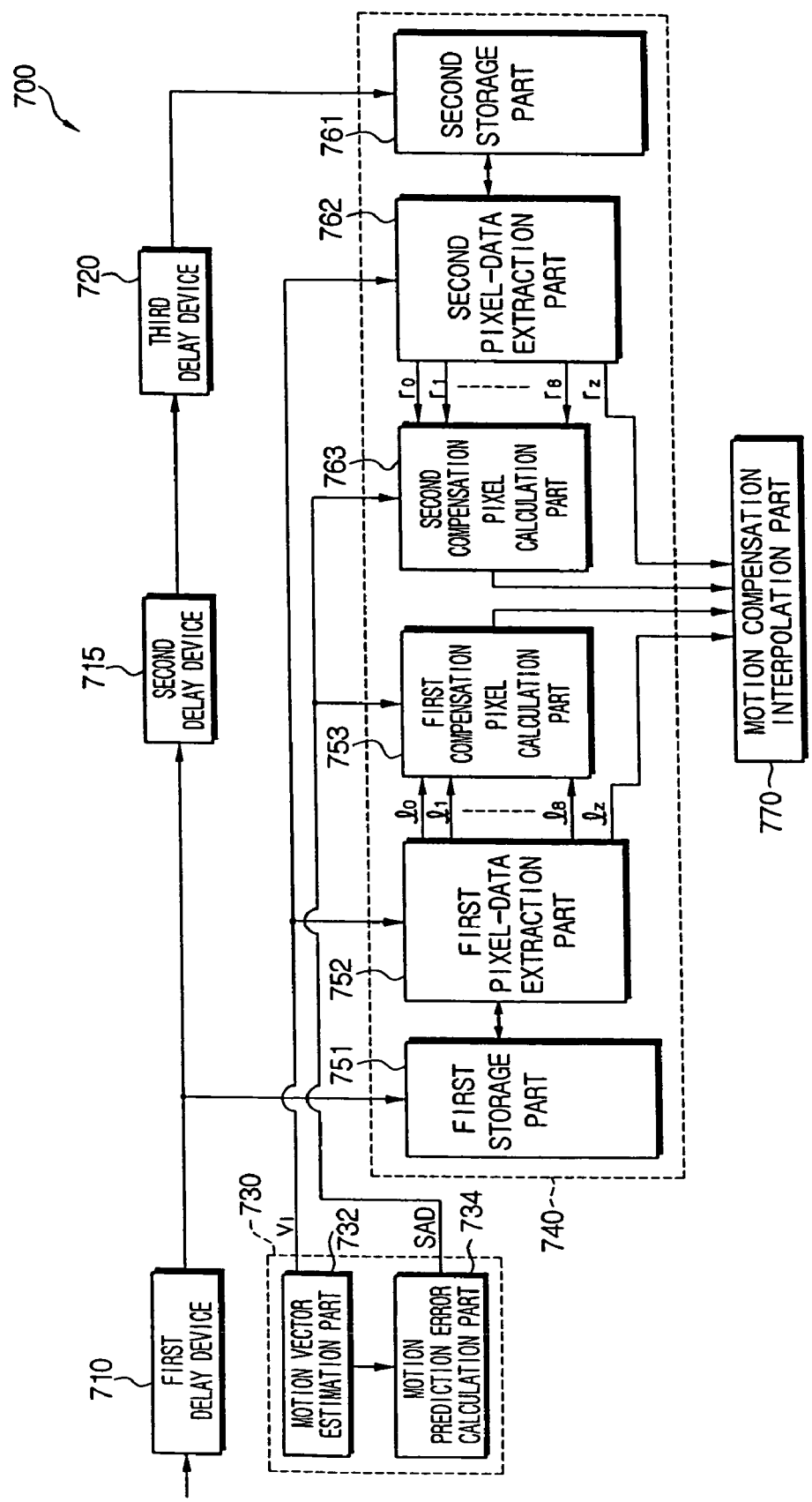
FIG. 7 is a block diagram schematically illustrating a motion estimation/compensation device where the pixel-data selection device is installed according to another embodiment of the present invention.

Meanwhile, FIG. 7 is a block diagram schematically showing the motion estimation/compensation device according to another embodiment of the present invention.

Referring to FIG. 7, the motion estimation/compensation device 700 includes a first delay device 710, a second delay device 715, a third delay device 720, a motion estimation part 730, a pixel selection part 740 and a motion compensation interpolation part 770. Since the present invention relates to the frame interpolation which compensates the motion by estimating a motion, the frame rate conversion device (not shown) will be described by illustrating the block related to the motion estimation/compensation only.

The motion estimation/compensation device 700 performs motion compensation using adjacent fields of the same property, and includes the motion estimation part 730, the pixel selection part 740 and the motion compensation interpolation part 770 of FIG. 7, of which a detailed description will be omitted since they are identical or similar in functions with the motion estimation part 330, the pixel-data selection part 340 and the motion compensation interpolation part 370 of FIG. 3.

Yet, while the motion estimation/compensation device 300 of FIG. 3 provides frame rate conversion of an image signal inputted by a frame unit or a field unit, the motion estimation/compensation device 700 of FIG. 7 is directed to providing frame rate conversion of an image signal which is inputted by a field unit. That is, while the motion estimation/compensation device 300 calculates the final interpolation pixel-data f for motion compensation between frames or between an odd field and an even field, the motion estimation/compensation device 700 of this embodiment calculates the final interpolation pixel-data f between odd fields or between even fields.

To be more specific, when a field outputted from the first delay device 710 is a first odd field, a field outputted from the second delay device 715 is a first even field, and a field outputted from the third delay device 720 is a second odd field. That is, the first odd field is the current field, and the second field is the previous field.

Also, the motion vector estimation part 732 estimates a plurality of motion vectors for the motion compensation between the first and the second odd fields having the same property. The motion vector can be estimated by calculating the motion prediction error. The motion prediction error calculation part 734 extracts the motion prediction error corresponding to the estimated motion vector, among the calculated motion prediction errors. According to the embodiments of present invention, the SAD is used for the motion prediction error.

The pixel selection part 740 calculates at least one compensation pixel $I_z$, $r_z$, $I'$, $r'$, using the pixel-data of the first and the second field inputted from an outside source, a plurality of the final motion vector and a plurality of SADs. For this, the pixel selection part 740 according to this embodiment includes a first storage unit 751, a first pixel-data extraction part 752, a first compensation pixel abstraction part 753, a second storage unit 761, a second pixel-data extraction part 762, and a second compensation pixel abstraction part 763, similar to the embodiment of FIG. 3.

The motion compensation interpolation part 770 calculates the final interpolation pixel-data f according to the soft switching value k, using the first and the second compensation pixel-data $I'$ and $r'$, respectively, supplied from the pixel selection part 730, and the first and the second pixel-data $I_z$ and $r_z$, respectively.

The motion compensation interpolation part 770 calculates the final interpolation pixel-data f using the soft switching value k inputted from the reliability calculation part (not shown). The final interpolation pixel-data f is calculated by the [Equation 9].

Figure 8:
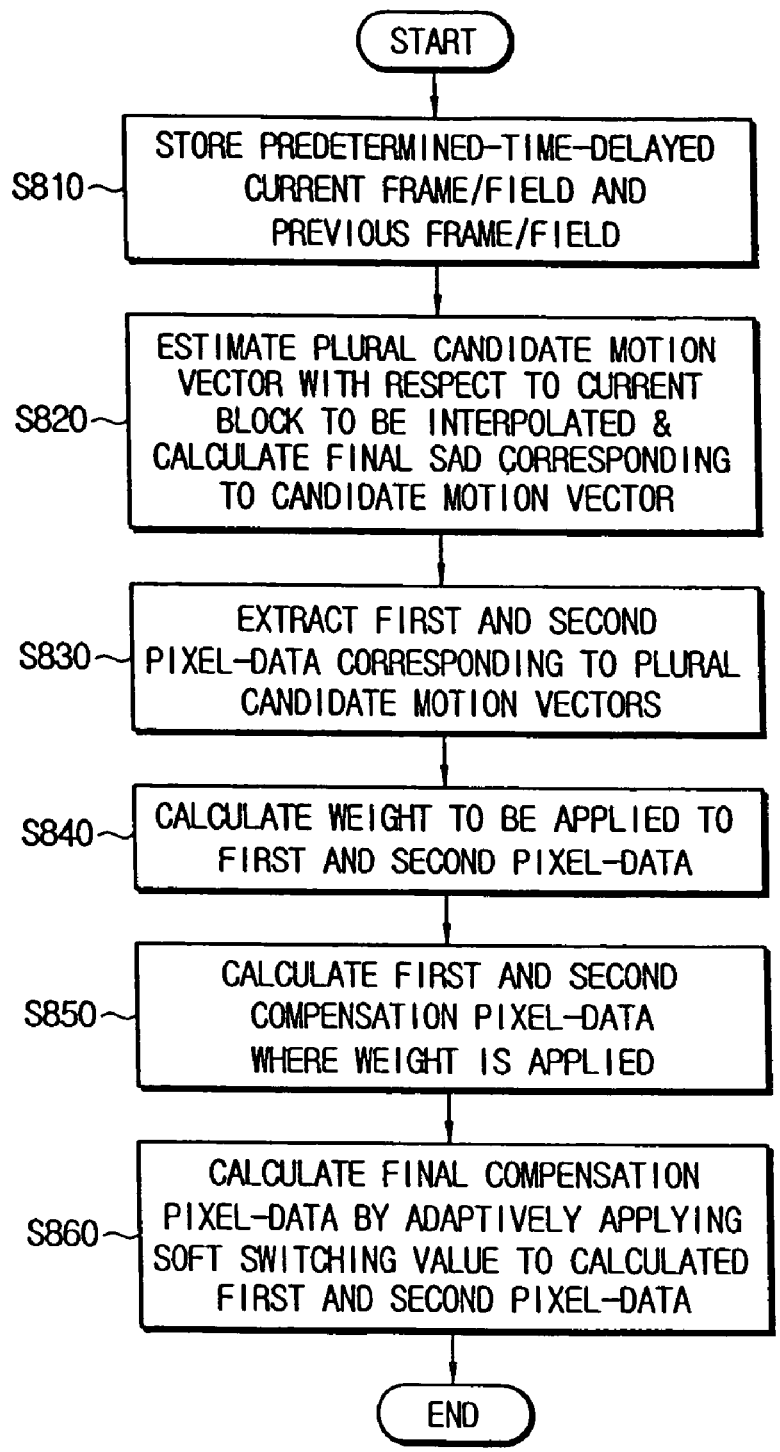
FIG. 8 is a flowchart schematically illustrating the motion estimation/compensation method of estimating motion vectors by selecting pixel-data as shown in FIG. 3.

FIG. 8 is a flowchart schematically illustrating the motion estimation/compensation method of estimating motion vectors by selecting pixel-data according to FIG. 3.

Regarding FIG. 8, first the first delay device 310 delays the inputted frame/field for a predetermined time period and outputs the current frame/field. The second delay device 320 delays the current frame/field ($F_n$) for a predetermined time period and outputs the previous frame/field ($F_{n-1}$). The outputted current frame/field ($F_n$) and the previous frame/field ($F_{n-1}$) are stored in the first and the second storage parts 351 and 361, respectively, in operation S810.

When the frame/field is inputted by interlacing, the current frame/field ($F_n$) is an odd or an even field, and the previous frame/field ($F_{n-1}$) is an even or an odd field.

In addition, the motion estimation part 330 calculates the minimum SADs with respect to the current block $B_0$ to be interpolated and the peripheral blocks $B_1$ to $B_8$, respectively, using the BMA. Further, the motion estimation part 330 estimates the respective final motion vectors $v_0$ to $v_8$ from the respective positions having the minimum SADs, and extracts the SADs corresponding to the current block $B_0$ to be interpolated and the peripheral blocks $B_1$ to $B_8$, respectively, in operation S820. Here, the final motion vectors $v_0$ to $v_8$ with respect to the current block $B_0$ to be interpolated and the peripheral blocks $B_1$ to $B_8$ are designated as the candidate motion vector of the current block $B_0$.

When there is a zero motion vector $v_z$ having zero value among the final motion vectors $v_0$ to $v_8$ which are estimated in operation S820, the pixel-data selection part 340 extracts the first and the second pixel-data $I_z$, $I_i$, $r_z$, $r_i$ (here, i=0, 1, ..., M) corresponding to the plurality of candidate motion vectors including the zero motion vector $v_z$ in operation S830.

When operation S830 is completed, the pixel-data selection part 340 calculates a predetermined weight to apply to the extracted first and second pixel-data $I_z$, $I_i$, $r_z$, $r_i$ (here, i=0, 1, ..., M), using [Equation 7] in operation (S840). Then, the pixel-data selection part 340 calculates the first and the second compensation pixel-data $I'$ and $r'$, respectively, which are applied with the weight, using [Equation 5] in operation S850.

When operation S850 is completed, the motion compensation interpolation part 370 calculates the final compensation pixel-data f by adaptively applying the soft switching value k to the calculated first and second compensation pixel-data $I'$ and $r'$, respectively, in operation S860.

Figure 2:
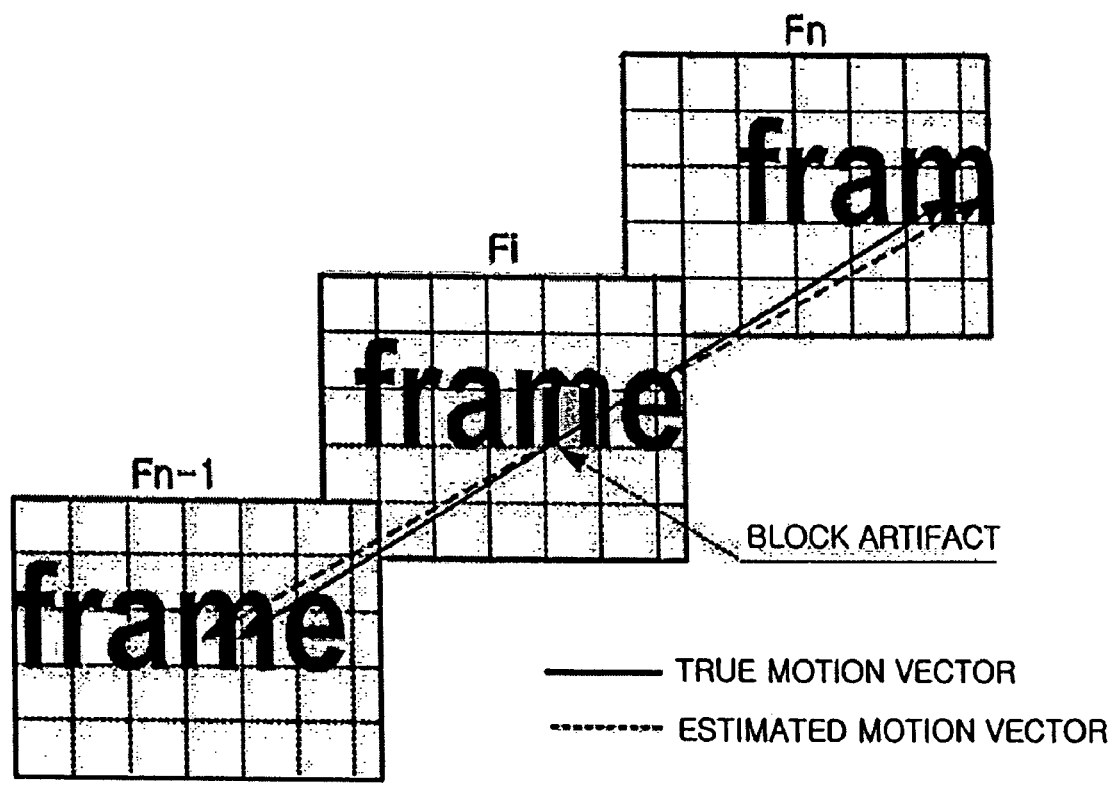
FIG. 2 is an example simulation of an image where block artifacts occur by a general conventional method of motion compensation.

According to the motion estimation/compensation devices 300 and 700 and the method of the same as described above, in performing the motion compensation of the blocks to be interpolated, the final motion vectors $v_1$ to $v_8$ of the peripheral blocks $B_1$ to $B_8$ as well as the final motion vector $v_0$ of the current block $B_0$, are used. That is, after SADs are calculated in the respective motion trajectories using the final motion vectors $v_0$ to $v_8$ of the current block $B_0$ and the peripheral blocks $B_1$ to $B_8$ the weight is calculated using the SADs. Further, the block artifacts occurring when the final motion vector $v_0$ of the current block $B_0$ is inaccurate, as shown in FIG. 2, can be prevented by applying the weight inversely proportional to the calculated SADs. That is, in the image outputted from the motion estimation/compensation device 300 according to FIG. 3, the block artifacts phenomenon is removed, as illustrated in FIG. 6.

As described above, the motion estimation/compensation device 300, capable of selecting the compensating pixel-data according to the embodiment of FIG. 3, extracts a plurality of compensating pixel-data to interpolate the current block $B_0$ by estimating not only the motion vector of the current block $B_0$, but also the motion vector of the peripheral blocks $B_1$ to $B_8$ adjacent to the current block. Accordingly, by considering the plurality of motion trajectories by the plurality of extracted compensating pixel-data, the block artifacts can be prevented or reduced, which is caused by an inaccurate estimation of the motion vector of the current block $B_0$. In addition, hardware can be more simply structured since all the motion trajectories which can be considered for a plurality of motion vectors are applied without additional processes.

While the invention has been shown and described with reference to certain preferred embodiments thereof, it will be understood by those skilled in the art that various changes in form and details may be made therein without departing from the spirit and scope of the invention as defined by the appended claims and equivalents thereof.

What is claimed is:

1. A pixel-data selection device to provide motion compensation, comprising:
a storage unit to store a current frame/field including first pixel-data corresponding to at least one of candidate motion vectors as inputted, and a previous frame/field including second pixel-data corresponding to the at least one of the candidate motion vectors;
a pixel-data extraction unit to extract the first and the second pixel-data which respectively correspond to the at least one of candidate motion vectors, respectively, from the storage unit; and
a compensation pixel calculation unit to calculate first and second compensation pixel-data, respectively, for motion compensation, by adaptively applying a predetermined first weight according to the first and the second pixel-data,
wherein the calculated first and second compensation pixel-data are used for the motion compensation of a current block to be interpolated.

2. The pixel-data selection device of claim 1, wherein the pixel-data extraction unit extracts the first and the second zero pixel-data corresponding to a block having the candidate motion vector of zero, respectively, from the storage unit, and the extracted first and second zero pixel-data are used for the motion compensation of the current block.

3. The pixel-data selection device of claim 1, wherein the compensation pixel calculation unit respectively multiplies at least one of the first and the second pixel-data by the first weights which are adaptively applied to at least one of the first and the second pixel-data, and adds the results of the multiplication to obtain the first and the second compensation pixel-data, respectively.

4. The pixel-data selection device of claim 1, wherein the sum total of the first weights applied to at least one of the first and the second pixel-data is 1.

5. The pixel-data selection device of claim 1, wherein the candidate motion vector comprises the motion vector of the current block in the current frame/field and motion vector of at least one peripheral block adjacent to the current block.

6. The pixel-data selection device of claim 5, wherein at least one of the candidate motion vectors is a vector estimated from a position corresponding to the minimum value, among a plurality of motion prediction errors calculated by applying a block matching algorithm with respect to the current block and the respective peripheral blocks.

7. The pixel-data selection device of claim 6, wherein the first weight, which is applied to at least one of the first and the second pixel-data, is inversely proportional to the motion prediction error calculated by the current block and the peripheral blocks.

8. The pixel-data selection device of claim 6, wherein the motion prediction error is calculated by a sum of absolute difference (SAD) or a mean absolute difference (MAD).

9. The pixel-data selection device of claim 1, further comprising:

a first delay device to delay an inputted frame/field for a predetermined time period, and to supply the delayed current frame/field to the storage unit; and
a second delay device to delay the current frame/field inputted from the first delay device, for a predetermined time period, and to supply the delayed previous frame/field to the storage unit.

10. The pixel-data selection device of claim 1, wherein the pixel-data extraction unit extracts at least one of the first and the second pixel-data by estimating motion trajectories by at least one of the candidate motion vectors.

11. The pixel-data selection device of claim 1, wherein the storage unit stores adjacent fields of the same property for the current frame/field and the previous frame/field, respectively.

12. The pixel-data selection device of claim 11, wherein the field of the same property is one of an odd field and an even field for the current frame/field and the previous frame/field, respectively.

13. The pixel-data selection device of claim 11, wherein the frame/field is inputted by a field unit.

14. The pixel-data selection device of claim 13, further comprising:
a first delay device to delay an inputted field for a predetermined time period, and to supply the delayed first field to the storage unit;
a second delay device to delay the first field inputted from the first delay device, for a predetermined time period, and to output the delayed second field; and
a third delay device to delay the second field inputted from the second delay device for a predetermined time period, and to supply the delayed third field to the storage unit,
wherein the first and the third fields are of the same property.

15. A method of pixel-data selection for motion compensation, comprising:
storing a current frame/field including at least one of first pixel-data corresponding to at least one of candidate motion vectors as inputted;
storing a previous frame/field including at least one of second pixel-data corresponding to the at least one of the candidate motion vectors;
extracting at least one of the first and the second pixel-data which respectively correspond to at least one of the candidate motion vectors, respectively, from the storing operations; and
calculating the first and the second compensation pixel-data, respectively, for motion compensation, by adaptively applying a predetermined first weight according to the first and the second pixel-data,
wherein the calculated first and second compensation pixel-data are used for the motion compensation of a current block to be interpolated.

16. The method of pixel-data selection of claim 15, wherein the first and the second pixel-data extracting operations extract the first and the second zero pixel-data corresponding to a block having the candidate motion vector of zero, respectively, from the storing operations, and the extracted first and second zero pixel-data are used for the motion compensation of the current block.

17. The method of pixel-data selection of claim 15, wherein the first and the second compensation pixel calculating operations multiply at least one of the first and the second pixel-data by the first weights, respectively, which are adaptively applied according to at least one of the first and the second pixel-data, respectively, and add the results of the multiplication to obtain the first and the second compensation pixel-data, respectively.

18. The method of pixel-data selection of claim 15, wherein the sum total of the first weights applied to at least one of the first and the second pixel-data is 1.

19. The method of pixel-data selection of claim 15, wherein the candidate motion vector comprises the motion vector of the current block in the current frame/field and motion vector of at least one peripheral block adjacent to the current block.

20. The method of pixel-data selection of claim 19, wherein at least one of the candidate motion vectors is a vector estimated from a position corresponding to the minimum value among a plurality of motion prediction errors calculated by applying a block matching algorithm with respect to the current block and the respective peripheral blocks.

21. The method of pixel-data selection of claim 20, wherein the first weight, which is applied to at least one of the first and the second pixel-data, is inversely proportional to the motion prediction error calculated by the current block and the peripheral blocks.

22. The method of pixel-data selection of claim 21, wherein the motion prediction error is calculated by a sum of absolute difference (SAD) or a mean absolute difference (MAD).

23. The method of pixel-data selection of claim 15, further comprising the operations of:
 prior to the current frame/field storing operation, delaying an inputted frame/field for a predetermined time period, and outputting the delayed current frame/field; and
 prior to the previous frame/field storing operation, delaying the current frame/field inputted from the first delay device, for a predetermined time period, and supplying the delayed previous frame/field.

24. The method of pixel-data selection of claim 15, wherein the first and the second pixel-data extracting operations extract at least one of the first and the second pixel-data by estimating motion trajectories by at least one of the candidate motion vectors.

25. A computer readable medium encoded with a computer program providing a method of pixel-data selection for motion compensation, wherein the method performs the operations including:
 storing a current frame/field including at least one of first pixel-data corresponding to at least one of candidate motion vectors as inputted;
 storing a previous frame/field including at least one of second pixel-data corresponding to the at least one of the candidate motion vectors;
 extracting at least one of the first and the second pixel-data which respectively correspond to at least one of the candidate motion vectors, respectively, from the storing operations; and
 calculating the first and the second compensation pixel-data, respectively, for motion compensation, by adaptively applying a predetermined first weight according to the first and the second pixel-data,
 wherein the calculated first and second compensation pixel-data are used for the motion compensation of a current block to be interpolated.

* * * * *